(12) United States Patent
Braun (10) Patent No.: US 10,730,389 B2
(45) Date of Patent: Aug. 4, 2020

(54) METHOD FOR OPERATING A VEHICLE INFORMATION SYSTEM AND VEHICLE INFORMATION SYSTEM OF A VEHICLE

(71) Applicant: VOLKSWAGEN AKTIENGESELLSCHAFT, Wolfsburg (DE)

(72) Inventor: Anna Braun, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 38 days.

(21) Appl. No.: 15/649,785

(22) Filed: Jul. 14, 2017

(65) Prior Publication Data
US 2018/0015829 A1 Jan. 18, 2018

(30) Foreign Application Priority Data

Jul. 15, 2016 (DE) .......... 10 2016 113 111

(51) Int. Cl.
*B60K 37/02* (2006.01)
*B60R 16/037* (2006.01)
*B60K 37/06* (2006.01)

(52) U.S. Cl.
CPC .............. *B60K 37/02* (2013.01); *B60K 37/06* (2013.01); *B60R 16/037* (2013.01);
(Continued)

(58) Field of Classification Search
CPC .. B60K 35/00; B60K 37/02; B60K 2350/403; B60K 2350/1004; B60K 2350/1072;
(Continued)

(56) References Cited

U.S. PATENT DOCUMENTS 7,774,136 B2 8/2010 Kato et al.
2002/0174427 A1* 11/2002 Kohno ............... G01C 21/3641
725/30
(Continued)

FOREIGN PATENT DOCUMENTS

CN 103365697 A * 10/2013
DE 102004038916 A1 3/2005
(Continued)

OTHER PUBLICATIONS

JPO machine translation of JP 2009-101798 (original JP document published May 14, 2009) (Year: 2009).*
(Continued)

*Primary Examiner* — Faris S Almatrahi
*Assistant Examiner* — David A Testardi
(74) *Attorney, Agent, or Firm* — Barnes & Thornburg LLP (57) ABSTRACT

A method for operating a vehicle information system of a vehicle, wherein an activation signal is received if a preparatory action of a user for putting the vehicle into operation is detected. Graphics data of an activation animation with a first display and a second display is generated as a function of the activation signal and is displayed in a display area. After the activation signal is received, an appearance of the first display is output, wherein the first display includes a first graphics object. A disappearance of the first display and an appearance of the second display are output. Also disclosed is a vehicle information system of a vehicle having a signal-generating unit by which a preparatory action of a user for putting the vehicle into operation is detected, and an activation signal is generated as a function of the detected preparatory action.

26 Claims, 7 Drawing Sheets

(52) U.S. Cl.
CPC ..... *B60K 2370/11* (2019.05); *B60K 2370/143* (2019.05); *B60K 2370/152* (2019.05); *B60K 2370/155* (2019.05); *B60K 2370/165* (2019.05); *B60K 2370/191* (2019.05)

(58) Field of Classification Search
CPC . B60K 2370/165; B60R 16/037; B60R 25/01; B60R 16/02; G06F 1/3231; G06F 9/4401; G06F 9/4403; G06F 9/4406; G09G 2330/026
See application file for complete search history.

(56) References Cited

U.S. PATENT DOCUMENTS

| | | | | |
|---|---|---|---|---|
| 2005/0119799 A1* | 6/2005 | Dupont | ............. | B60K 37/02 701/1 |
| 2007/0030133 A1* | 2/2007 | Campbell | ............. | B60K 35/00 340/438 |
| 2007/0088501 A1* | 4/2007 | Kato | ............. | G01C 21/26 701/425 |
| 2008/0309475 A1* | 12/2008 | Kuno | ............. | B60K 35/00 340/462 |
| 2012/0044351 A1* | 2/2012 | Kook | ............. | B60K 35/00 348/148 |
| 2013/0127609 A1* | 5/2013 | Sitarski | ............. | B60R 1/00 340/438 |
| 2014/0104365 A1* | 4/2014 | Haugen | ............. | H04M 3/567 348/14.07 |
| 2014/0232870 A1* | 8/2014 | Mondal | ............. | H04N 7/01 348/148 |
| 2014/0294368 A1* | 10/2014 | Ishiwata | ............. | G11B 27/005 386/343 |
| 2015/0019854 A1* | 1/2015 | Zhou | ............. | G06F 9/4406 713/2 |
| 2015/0353012 A1* | 12/2015 | Hwang | ............. | B60R 1/00 348/118 |
| 2016/0189685 A1* | 6/2016 | Ryan | ............. | G09G 5/36 345/547 |
| 2016/0224222 A1* | 8/2016 | Mori | ............. | B60K 35/00 |
| 2017/0015246 A1* | 1/2017 | Honghalli Devaraju | ............. | G06F 9/4401 |
| 2017/0031693 A1* | 2/2017 | Honghalli Devaraju | ............. | G06F 9/4403 |
| 2017/0253122 A1* | 9/2017 | Jun | ............. | B60K 35/00 |
| 2018/0018083 A1* | 1/2018 | Cengil | ............. | B60K 35/00 |

FOREIGN PATENT DOCUMENTS

| | | | | |
|---|---|---|---|---|
| DE | 102008016527 A1 | | 3/2009 | |
| DE | 102013000273 A1 | | 7/2014 | |
| EP | 2190686 A1 | | 6/2010 | |
| JP | 06195056 A | * | 7/1994 | |
| JP | 2003510586 A | | 3/2003 | |
| JP | 2007064761 A | * | 3/2007 | ............. B60K 37/02 |
| JP | 2007064761 A | | 3/2007 | |
| JP | 2009101798 A | * | 5/2009 | ............. G06F 8/60 |
| JP | 2012240467 A | | 12/2012 | |
| JP | 2012240467 A | * | 12/2012 | |
| JP | 2014156189 A | * | 8/2014 | |
| JP | 2014156189 A | | 8/2014 | |
| KR | 20000025962 A | | 5/2000 | |
| KR | 20100046049 A | | 5/2010 | |
| WO | 9809846 A1 | | 3/1998 | |
| WO | WO-2005122129 A1 | * | 12/2005 | ............. G06F 8/60 |
| WO | WO-2014/108165 A1 | * | 7/2014 | |
| WO | WO-2015/150872 A1 | * | 10/2015 | |

OTHER PUBLICATIONS

EPO machine translation of CN 103365697 (original CN document published Oct. 23, 2013) (Year: 2013).*
Toyota FAQ, "What does the Toyota logo represent?", retrieved Mar. 9, 2019 from http://toyota.custhelp.com/app/answers/detail/a_id/7649/~/what-does-the-toyota-logo-represent%3F, 1 page (Year: 2019).*
Wikipedia article, "Digital video", old revision dated May 12, 2016, 8 pages (Year: 2016).*
Office Action for Korean Patent Application No. 10-2017-0089712; dated Nov. 23, 2018.
Office Action for Korean Patent Application No. 10-2017-0089712; dated Jul. 12, 2018.

* cited by examiner

METHOD FOR OPERATING A VEHICLE INFORMATION SYSTEM AND VEHICLE INFORMATION SYSTEM OF A VEHICLE

PRIORITY CLAIM

This patent application claims priority to German Patent Application No. 10 2016 113 111.3, filed 15 Jul. 2016, the disclosure of which is incorporated herein by reference in its entirety.

SUMMARY

Illustrative embodiments relate to a method for operating a vehicle information system of a vehicle and to a vehicle information system of a vehicle.

BRIEF DESCRIPTION OF THE DRAWINGS

The disclosed embodiments will now be explained with reference to the drawings.

DETAILED DESCRIPTION

To improve the safety and the comfort when driving with a vehicle, a user of a vehicle is provided with a large amount of information, for example, to facilitate the monitoring of the journey and of the operation of the vehicle, to provide information about the activity of driver assistance systems or to facilitate the handling of secondary organizational tasks. In this context, increasingly complex computing systems which have to be started and powered up while the vehicle is put into operation and at the start of a journey are integrated in modern vehicles. In known systems, undesired delays and waiting times frequently occur in this context before the driver can perform the desired operator control or retrieve specific information.

The disclosed embodiments provide a method for operating a vehicle information system and a vehicle information system of the type mentioned above in which the system activity is output to a user in a way which can be perceived easily.

In the disclosed method for operating a vehicle information system, an activation signal is received if a preparatory action of a user for putting the vehicle into operation is detected. Graphics data of an activation animation with a first display and a second display is generated as a function of the activation signal and displayed using a display area. In this context, after the reception of the activation signal, an appearance of the first display is output, wherein the first display comprises a first graphics object. Subsequently, a disappearance of the first display and an appearance of the second display are output.

The activation animation can be used here as a waiting animation to span a waiting time for the user and signal an activity of the system.

The preparatory action of a user for putting the vehicle into operation, which action is detected with the disclosed method, can be embodied in different ways and be detected in a manner known per se. These actions include actions of a user or states relating to him which indicate an intention to put the vehicle into operation and, in particular, to start a journey with the vehicle.

According to at least one disclosed embodiment of the method, the detected preparatory action comprises an approaching process, an unlocking process, opening of a door, getting in or sitting down by the user or starting of the vehicle. As a result, the activation animation may be synchronized with important operations for preparing a journey with the vehicle. In addition, based on signals which are received in this way it is possible to determine whether the driver is in a specific phase of the preparation for the journey with the vehicle.

The activation signal which is received with the method can, for example, be generated and output by a unit which is coupled to sensors and in this way detects the preparatory action. The activation signal can then be generated in such a way that it comprises, for example, information about the specific detected preparatory action, for example, to adapt the activation animation as a function thereof.

The activation signal can be understood to be a first trigger. The detection of the preparatory action and the reception of the activation signal can take place in various ways which are known per se. For example, operator control of a user can be detected or a specific state of the vehicle or of one of its devices can be detected. In addition, sensors of the vehicle can be used, for example, a seat mat, sensors relating to the state of doors of the vehicle, proximity sensors and/or a lock system of the vehicle.

Alternatively or additionally, external unit can be used to detect the preparatory action and/or to receive the activation signal. The activation signal can be generated here by the external unit or by an internal unit of the vehicle as a function of a state of the external unit. In addition, a data-transmitting connection can be established and detected between an external unit and an internal unit, for example, when a connection is set up from the vehicle to a contactless key, a mobile user device, an external server or another communication unit.

With the method at least one display area is provided. The display area can be permanently installed or movable, for example, pivotable. In at least one disclosed embodiment, in addition one or more further display areas can be provided which are arranged spaced apart from one another. In this case, the positions of the display areas relative to one another, can be taken into account for the activation animation.

According to a further disclosed embodiment, the first graphics object of the first display is displayed by a first display area. As a result, a first output of data via the first display area may be made possible, even before the transition to the second display has been completed based on a transition signal. There is provision here that no further display areas for outputting are used in the first display.

According to one development, the second display is displayed by the first display area and a further display area. As a result, data may be output based on the second display, both by the first display area and the further display area. As a result, for example, a larger area can be used to output a relatively large quantity of information in a structured and clearly comprehensible manner. In addition, an integrated display concept can be used in which the display areas output various items of supplementary information.

The appearance of the second display can comprise a movement effect. This movement effect can be formed in different ways. A graphic effect is provided here which comprises a change of location as a function of the time. For example, a change of location can be output in a specific direction over the surface of the display area.

In one display including a plurality of display areas in the vehicle, the movement effect can be formed in such a way that the geometry of the arrangement of the display areas is taken into account. In this context, a movement from the first display area to a further display area is displayed, wherein, in addition to this, a movement can also be displayed in another direction, for example, away from the further display area.

For example, the spreading of a pulse can be displayed in that spatial propagation of a specific graphic property of the display is displayed over the surface of the display area. In this context, the graphic property of the display can relate to various parameters of the graphic display. Alternatively or additionally, the movement effect can comprise displacement and/or rotation. In addition, there can be provision that spreading is displayed wherein an increasing extent of a display and/or property of the display is generated over a specific surface region.

According to a further development, during the movement effect a movement of a region with increased brightness is displayed. As a result, the movement effect may be displayed in a way which is easy to perceive. For example, in this way the spreading of a light pulse can be displayed. In addition, in an analogous manner to this a movement of a region can be output with brightness which is reduced compared to the surroundings, or a movement of a region which contrasts with another property can be displayed.

The first and second displays can be displayed dynamically. For example, a time-dependent change of a property of the display can be output, for example, a movement of an element of the display which is output on the display area and/or a changing parameter of the display, for example, brightness, intensity, color or contrast.

According to at least one disclosed embodiment, in addition a transition signal is received, and the disappearance of the first display and the appearance of the second display are output after the reception of the transition signal. The transition signal can be understood to be a second trigger. It can be received, for example, when a further preparatory action for putting the vehicle into operation is detected which chronologically follows the preparatory action for the reception of the activation signal. The activation animation may be displayed incrementally and synchronized with a plurality of preparatory actions for the putting into operation.

The reception of the transition signal takes place here in a manner which is analogous to the reception of the activation signal in a manner known per se, wherein various devices and/or sensors of the vehicle can be used. For example, the transition signal can be received if an approaching process, an unlocking process, opening of a door, getting in or sitting down by the user or starting of the vehicle is detected. A plurality of such preparatory actions are typically necessary to put the vehicle into operation and start a journey.

The activation signal is received here chronologically before the transition signal, wherein there can be provision that the transition signal is not received until after the full appearance of the first display. In addition, the effect of the transition signal on the display after the appearance of the first display can become visible. A specific time period is provided here between the two signals. It is sufficient to generate the activation animation here that the activation signal has been received, while the transition signal can also be received during the outputting of the activation animation. For example, a plurality of operations of the activation animation can be output in a coordinated manner in coordination with the reception of the transfer signal.

The formation of the activation animation as a function of the activation signal and the transition signal can take place in various ways. For example, the signals can have various embodiments and the graphics data can be generated as a function of these embodiments. In addition, there can be provision that the respective times of reception of the two signals are taken into account.

According to one development, the appearance of the first and/or second display comprises fading in. As a result, a fluid transition may be generated between various displays, while the detection of the data which is output would possibly be made difficult by hard transitions. The user can in this way easily perceive a display without having to completely re-orient himself after the transition from the first display to the second display.

The term "fading in" is to be understood here as meaning that for an object of a display a transition is generated from a relatively dark display to a relatively bright display. Further graphics elements can be used in an analogous manner, for example, a change of the transparency, of the contrast, of the coloring or of further properties. The object can be displayed as popping up against a background.

In an analogous manner to this there can be provision that the disappearance of the first and/or second display comprises fading out. This can be understood as meaning a reversed graphic effect compared to the fading in, for example, by a transition from a bright display to a dark display or by the changing of further graphic properties of the display or of the displayed objects.

The appearance and disappearance of the first and/or second display can be generated here for the respective display in its entirety or in an analogous manner for individual elements of the display. For example, when a device disappears individual displayed elements of the display can be faded out in succession. In addition, various graphic effects can be applied to various elements, for example, a transition from bright to dark for the one element and a transition from low transparency to high transparency for the other element of the display.

Alternatively or additionally, further display forms can be used to generate an appearance and/or disappearance of the displays, for example, a movement of elements of the respective display, for example, in the sense of "flying away" or "flying in" of elements of the display, wherein a movement of the elements from a region outside the display which can be provided is displayed.

The first graphics object is formed in a manner known per se and can comprise a trademark, in particular a logo or sign of a company. As a result, good recognition and integration into a further disclosed embodiment concept may be achieved. In this context, a trademark of a manufacturer of the vehicle or of the vehicle information system can be displayed. In addition, the trademark can be displayed dynamically, for example, by movement of elements of the display.

In addition there can be provision that the first display is adjustable. For example, it can be configured by the user and/or a personalized display can be generated for the user and output.

According to a further disclosed embodiment, to generate the graphics data of the first display an animation sequence is retrieved from a non-volatile storage medium. As a result, displaying of the first display which is fast and easy to process may be carried out.

There is provision here that a predefined display is output as a first display, wherein, for example, it is not necessary to power up relatively complex systems, for example, a relatively elaborate computer system. In addition, the appearance of the first display and also a first section of the activation animation can be permanently predefined.

According to at least one disclosed embodiment of the method, the second display comprises a first display object and a second display object. In this context, the display objects have scales and indicator elements. This permits values of parameters, for example, operational parameters of the vehicle, to be displayed by the display objects of the second display.

In this context, display objects are graphics objects, by which a display of a value of a parameter can be output. For example, for this purpose round instruments, or displays in the manner of analogue round instruments, can be used, which can also be referred to as tubes. Parameters such as the speed, rotational speed or a mode of operation of a vehicle are typically displayed using such tubes.

According to a further refinement, the scales of the display objects have scale elements, wherein during the appearance of the second display a movement of the scale objects with respect to target positions along the scales of the display objects is displayed. Therefore, the scales are made to appear in a way which can be perceived easily. The scale elements can be, for example, scale bars or sections, for example, segments, of a scale. For example, a combination of the scales from the scale elements can be displayed, with the result that the user can track over a specific time period how the scales build up.

In addition it is possible to provide that the indicator elements of the display objects appear in a chronologically offset manner after the start of the appearance of the display objects. In addition, the indicator elements can be displayed using a lighting effect, for example, in the manner of a laser beam, which displays an indicator element through its profile.

According to one development, the first display element and second display elements are arranged spaced apart from one another, wherein an intermediate space is formed, and a background display is displayed with a chronological offset after the start of the appearance of the display objects in the intermediate space. As a result, structuring of the display can be achieved in such a way that the information which is output by the display elements can be perceived separately from the information in the background display.

According to one development, the first display object and/or the second display object are embodied as a round instrument. This permits important parameters in a vehicle to be output, for example, speed and rotational speed, in a manner which is typically familiar to the user.

According to a further development, in addition operational data of a vehicle are detected and the second display is generated as a function of the detected operational data. This permits the display to be used to output relevant operational display for the user.

The display of the operational data can take place here in a manner known per se, for example, using the tubes and/or other graphic elements for outputting data. It is possible to display, for example, a state of charge and/or filling level of an energy accumulator or an ambient temperature and/or internal temperature. In addition, information relating to a computer system can be displayed, for example, about available and/or currently running application programs, for example, a media playback program. Operational data of further devices which have a data-transmitting connection to the vehicle, for example, a mobile user device such as a cell phone or a mobile computer, can also be taken into account here.

According to one development, the display area is surrounded by a combination instrument of a vehicle. In addition, a further display area can be surrounded by a central display of the vehicle. As a result, displays which are typically provided in vehicles and by which the data can be output in an easy to perceive manner are used. There can be provision here that the first display is output by the combination instrument, while at the transition to the second display the display is displayed spreading out onto the central display.

In addition there can be provision that one or more of the display areas is surrounded by a mobile unit, for example, a cell phone or a mobile computer of the user. The activation animation can also be output in an analogous manner here.

According to one development, during the displaying of the activation animation a starting process of a computer is carried out, wherein the activation animation is generated and displayed as a function of a chronological sequence of the starting process. As a result the activation animation can be generated in such a way that the output of the second display is concluded when the starting process is concluded. The activation animation can as a result be used as a waiting animation, to better convey to the user the waiting until the computer is completely ready to use.

It can be ensured that the starting process, for example, the powering up of the computer, is not experienced as a disruptive delay in the sequence but instead that the user recognizes that the system is already active and the completely powered-up state is established. The time period between the starting of the system and the reaching of a completely ready-to-use state can depend on various circumstances here on the time required for the loading of the operational data and for the automatic testing of system components. During this period, an empty screen or a display is typically output, for example, a display of an hour glass, with the result that the user cannot recognize how far the starting process has progressed. Since the activation animation is generated as a function of a chronological sequence of the starting process, the waiting time can, in contrast, be made more easily comprehensible to the user.

In this context, during the powering up the chronological sequence can be determined, for example, based on the conclusion of certain sections of the powering up process. For example, a first and/or second signal can be generated by the computer and used in turn to generate the activation animation. Such a signal of the computer can be generated, for example, during or after the start of a specific program or after the execution of a specific program during the powering up process of the computer. For example, there can be provision that after the reception of the activation signal in addition to the appearance of the first display the powering up of the computer is also triggered. Alternatively or additionally, the transition signal can be generated after the provision of a specific fundamental operational capability of the computer. In addition there can be provision that after the reception of the transition signal, the disappearance of the first and the appearance of the second display is additionally formed as a function of the progress of the powering up process. In addition, further signals can be generated by the computer as a function of the sequence of the powering up process and used to output a relationship between the powering up and the activation signal or transition signal.

In addition, a specific time period can be provided for the powering up, with the result that the chronological sequence of the activation animation can be generated using a permanently predefined chronological sequence.

According to a further disclosed embodiment, the second display comprises at least one display object and an application region, wherein the application region comprises application areas. Therefore, it is possible to form clearly delimited regions in which specific data can be output.

In this context, the at least one display object can be formed according to the manner of a round instrument described above. An area of the display by which further data can be output, for example, for a display and operator control of application programs, can be provided as an application region, wherein the application programs can be executed both by a computer of the vehicle and by the computer of a mobile device.

For example, the application region can be embodied as a background display. An intermediate space formed by two display objects which are displayed in the foreground, for example, between two round instruments, can be used for the display of the background display. As a result, an intermediate space enclosed by two displayed round instruments can be used as an application area, for example, on a display area of a combination instrument; in addition, the application area can also be arranged at least partially inside the round instruments. In addition, the application region can be embodied on the second display area, in particular a central display.

The display of the data of the application programs is carried out using application areas, wherein a specific region of the area of the application region is assigned to the data of a specific application program. The region of the area which is assigned to an application program is embodied as an application area, in particular a tile, widget or window.

According to one development, the application areas of the second display are assigned to applications, and after the appearance of the second display in the display areas, output data of the applications are displayed. As a result, output data of applications, that is to say application programs, are output via the second display.

There can be provision that the second display appears into stages: in a first stage the application areas can be displayed, wherein there is provision that in the first stage no specific contents of the application programs which are assigned to the application areas are output. For example, a structure of the division of the area can be displayed in the manner of a framework. For example, the display in this first stage takes place in such a way that the dimensions of the application areas can be perceived, for example, based on enclosures of the respective application areas. In a second stage, the display of output data of the respectively assigned application programs within the application areas then follows.

For example, in the first stage a tile structure or template by which the contours of the application areas can be detected can be displayed. In this context there can be provision that a relationship to the respectively assigned application programs is already established, for example, using a permanently predefined display. In addition, in the first operation a dynamic display can take place, for example, using a movement or a displayed lighting effect of the application areas. For example, a movement of a displayed highlighted feature can be output.

In the second stage the application areas can then be filled with output data of the application programs, for example, in that a display which is generated dynamically by an application program is output in the region of the assigned application area. It is also possible to provide here that in addition a movement or a displayed lighting effect is output.

The disclosed vehicle information system comprises a signal-generating unit by which a preparatory action of a user for putting the vehicle into operation can be detected, and an activation signal can be generated as a function of the detected preparatory actions. It additionally comprises a receiver unit by which an activation signal can be received, and a graphics unit by which graphics data of an activation animation can be generated with a first display and a second display as a function of the activation signal. It also comprises a display area by which the graphics data can be displayed, wherein after the reception of the activation signal, an appearance of the first display can be output, wherein the first display comprises a first graphics object. Subsequently a disappearance of the first display and an appearance of the second can be output.

The disclosed vehicle information system is designed to implement the disclosed method as described above. The vehicle information system therefore has the same benefits as the disclosed method.

The detected preparatory action can comprise, for example, an approaching process, an unlocking process, opening of a door, getting in or sitting down by a user or starting of the vehicle.

The detection of the activation signal and of the transition signal takes place here in a manner known per se, wherein an interface to a device of the vehicle is provided by which a detected signal can be transmitted to the vehicle information system.

In at least one disclosed embodiment, a further display area is additionally provided which is arranged spaced apart from the display area. This permits the area for the outputting of the displays to be enlarged and information which is output to be structured by suitable selection of the display area.

In this context there can be provision that the first graphics object of the first display can be displayed by a first display area. In addition, the second display can be formed in such a way that the second display can be displayed by the first and a second display areas. This permits further improved structuring of the data which is output.

In a further disclosed embodiment there is provision that the second display comprises a first display object and a second display object. The display objects have scales and indicator elements. As a result, after the change over to the second display at least two values of relevant parameters can be output.

Figure 1:
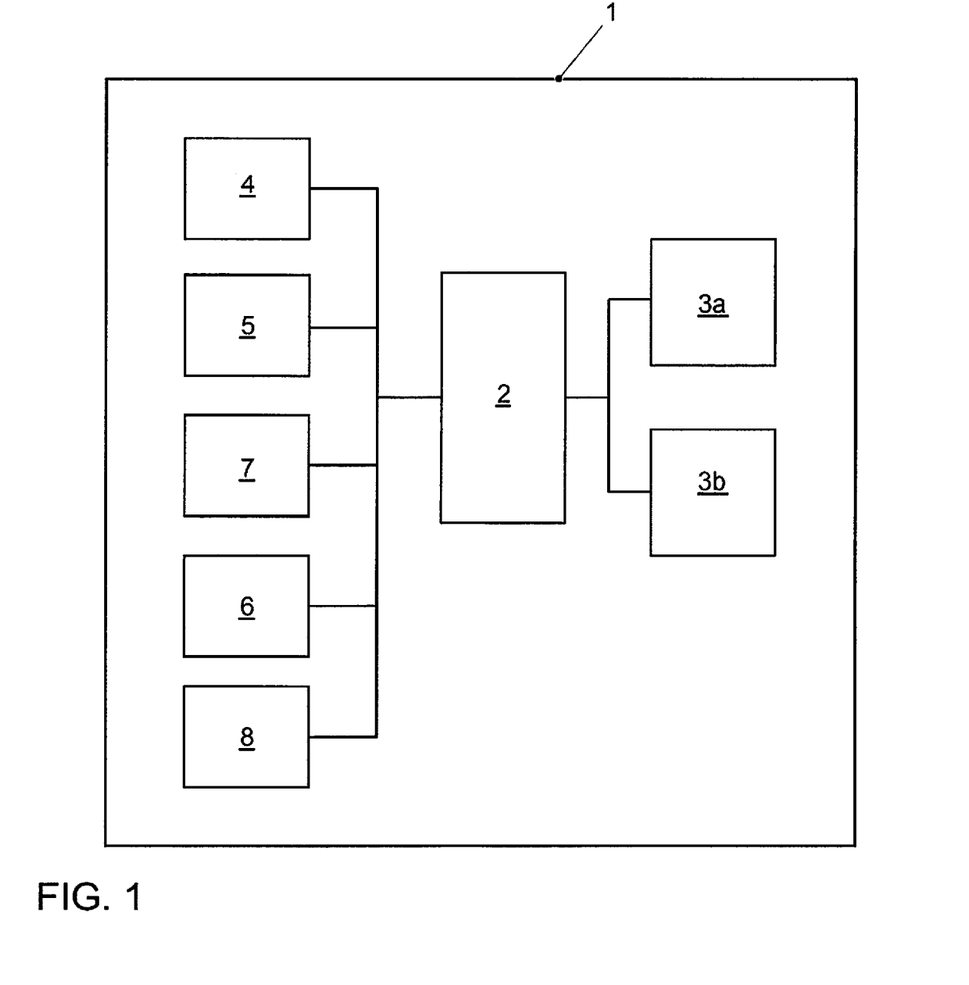
FIG. 1 shows a vehicle with an exemplary embodiment of the disclosed vehicle information system.

A vehicle with an exemplary embodiment of the disclosed vehicle information system will be explained with respect to FIG. 1.

A vehicle 1 comprises a first display area 3a and a second display area 3b. In the exemplary embodiment, the first display area 3a is surrounded by the combination instrument of the vehicle 1, while the second display area 3b is surrounded by a central display of the vehicle 1. The display areas 3a, 3b are coupled to a control unit 2. In addition, a receiver unit 4, a graphics unit 5, a computer 6 and a non-volatile storage medium 7 as well as a signal-generating unit 8 are coupled to the control unit 3.

An exemplary embodiment of the disclosed method will be explained with respect to FIG. 1. Here, the disclosed vehicle information system which is described above is taken as the basis.

In a first operation, the signal-generating unit 8 detects a preparatory action of a user to put the vehicle 1 into operation. This takes place in the exemplary embodiment using sensors of the vehicle 1 by which, for example, unlocking of the vehicle 1 is detected. In further exemplary embodiments, other events and states are detected, for example, opening of a door of the vehicle 1, approaching of a driver to the vehicle 1, getting in or sitting down by a user or starting of the vehicle 1. In addition, other events can be alternatively or additionally detected.

Using the detected preparatory action, the signal-generating unit 8 generates an activation signal and subsequently outputs the signal to the receiver unit 4 which receives the activation signal.

In the exemplary embodiment, using the activation signal, a starting process of the computer 6 is also initiated, in particular powering up of the computer 6. In this context, it is continuously detected to what extent the powering up is concluded and how long the starting process will still last. Within the course of the powering up, output data of application programs of the computer 6 which can be subsequently displayed are loaded and/or newly generated.

As a function of the activation signal, the graphics unit 5 generates graphics data of a first display which is subsequently output by the display areas 3*a*, 3*b*. In this context, it is provided in the exemplary embodiment that the first display merely brings about a display on the first display area 3*a*, while the second display area 3*b* remains dark. The first display is explained below in detail.

In a further operation, a transition signal is received by the receiver unit 4. The transition signal can also be received in various ways, in a manner analogous to the above explanations relating to the activation signal. For example, the transition signal can be generated if closing of a driver's door of the vehicle 1 or sitting down on a driver's seat is detected. In addition, the transition signal can alternatively or additionally be generated based on other events. In addition, the transition signal can be generated automatically, for example, after the expiry of a specific time period or as a function of the progress of the starting process of the computer 6.

As a function of the transition signal, the graphics unit 5 generates graphics data of a second display which is subsequently output by the display areas 3*a*, 3*b*. In this context there is provision in the exemplary embodiment that the second display is effected in a distributed manner on the first display area 3*a* and the second display area 3*b*. In the exemplary embodiment, operational data of the vehicle 1 is detected and the second display is generated as a function of the detected operational data. The operational data can relate here in a wide sense to all the information about the operation of the vehicle 1, for example, data about the movement of the vehicle 1 or about application programs which are executed by the computer 6. The second display is also explained below in detail.

The appearance of the first and/or second display is effected by fading in, wherein starting with a dark screen of the first display area 3*a* the respective display appears by continuously increasing the brightness. This is displayed a corresponding animation sequence. In this context, other methods which are known per se are alternatively or additionally used to display the sequence of the appearance of the displays, for example, by a separate appearance of elements from which the displays then appear to be assembled.

In the exemplary embodiment there is provision that to generate the graphics data of the first display an animation sequence is retrieved from the non-volatile storage medium 7. That is to say the animation sequence which is output when the first display appears does not have to be newly generated whenever the method is executed but instead is already present and only has to be loaded and reproduced in a suitable form.

After the reception of the transition signal, the first display disappears and the second display appears. In this context, a transition is also illustrated which in turn comprises an animation sequence at the end of which the display of the complete second display occurs. The transition is formed in such a way that it extends essentially over the time of the powering up of the computer 6.

An animation sequence can also be at least partially retrieved from the non-volatile storage medium 7 here, therefore permitting the necessary computational capacity to be reduced.

In further exemplary embodiments three can be provision that various implementations of the activation signal and/or transition signal can be received, for example, various events can bring about the generation of the signals, or a specific driver can be detected. In this context there can also be provision that the generation of the first and/or second display and/or that of the transition differs and, for example, a personalized output which is matched to the driver is generated.

An exemplary embodiment of a display which is generated by the disclosed method on a display area will be explained with reference to FIGS. 2A to 2F. In this context, the vehicle information system as described above and the disclosed method for operating the system are taken as the basis.

After the reception of the activation signal, the graphics unit 5 generates and outputs graphics data of the first display 10. In the illustrated exemplary embodiment there is provision that in the first display 10 merely a display on the first display area 3*a* takes place, while the second display area 3*b* remains empty.

Figure 2A:
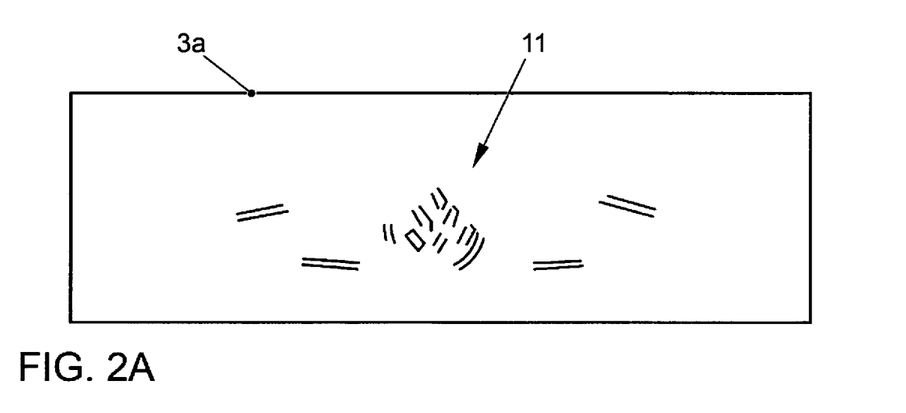
FIGS. 2A-2F show an exemplary embodiment of a display, generated by the disclosed method, on a display area.
Figure 2B:
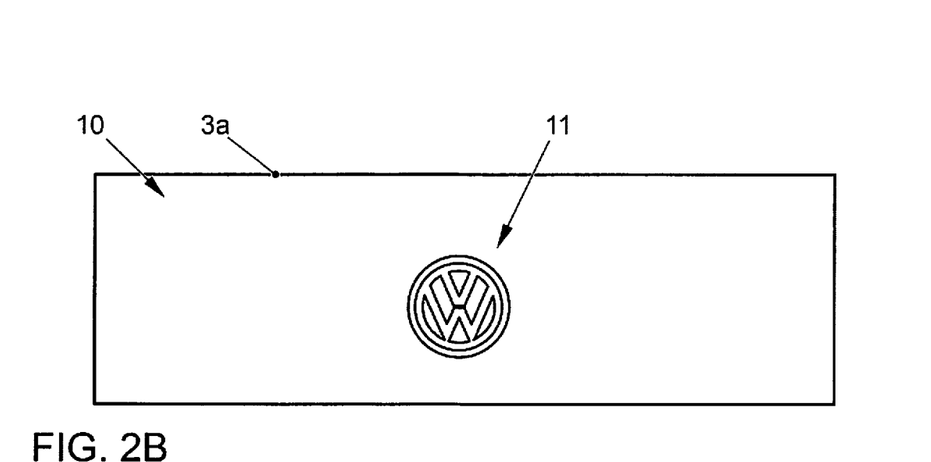

FIGS. 2A and 2B show the appearance of the first display 10, wherein fading in of a first graphics object 11 in FIG. 2A is indicated by dashed lines. The first graphic element 11 in the exemplary embodiment is a logo of a vehicle manufacturer. Alternatively or additionally, other graphics objects may be included, for example, a profile image of a user or another element.

The appearance of the first graphics object 11 is displayed by continuously increasing its brightness, wherein a dark screen of the display area 3*a* is taken as the basis. In addition to this, in the exemplary embodiment there is provision that further lighting effects are output in the region of the display area 3*a*, for example, a glimmer of light which moves over the display area 3*a*. In the case shown in FIG. 2B, the first display 10 has finally appeared completely on the first display area 3*a*.

In further exemplary embodiments, an animated first graphics object 11 can be provided, which, for example, moves continuously and/or in which a display parameter changes dynamically, for example, a color or brightness.

Figure 2C:
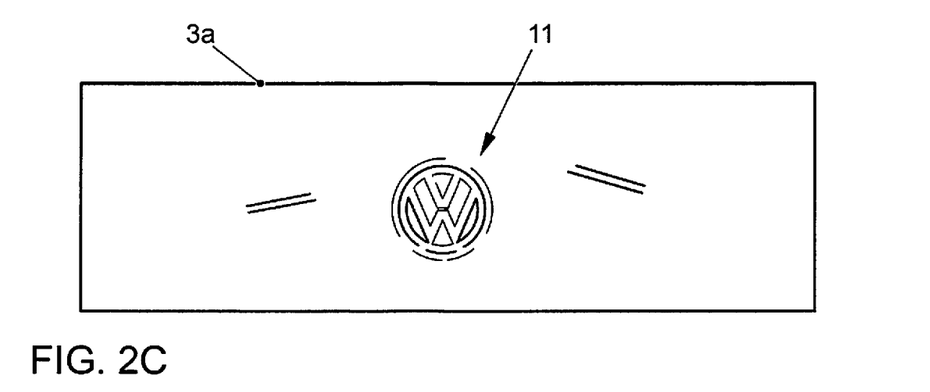
Figure 2D:
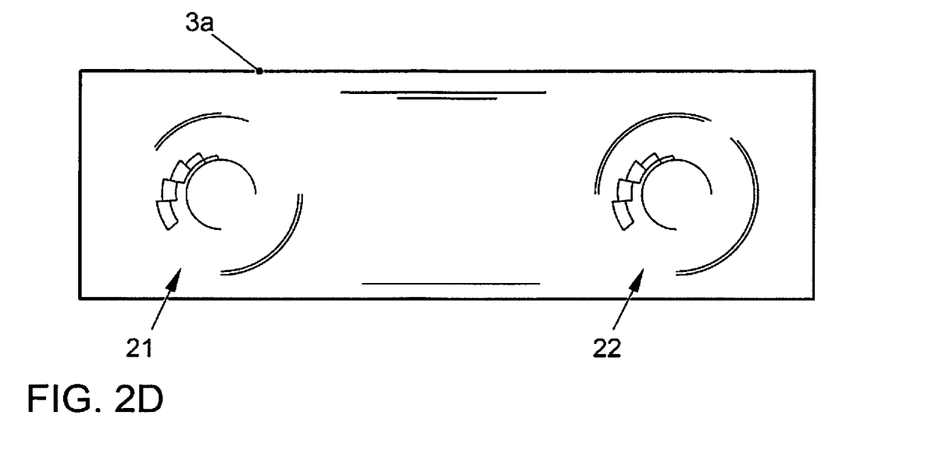
Figure 2E:
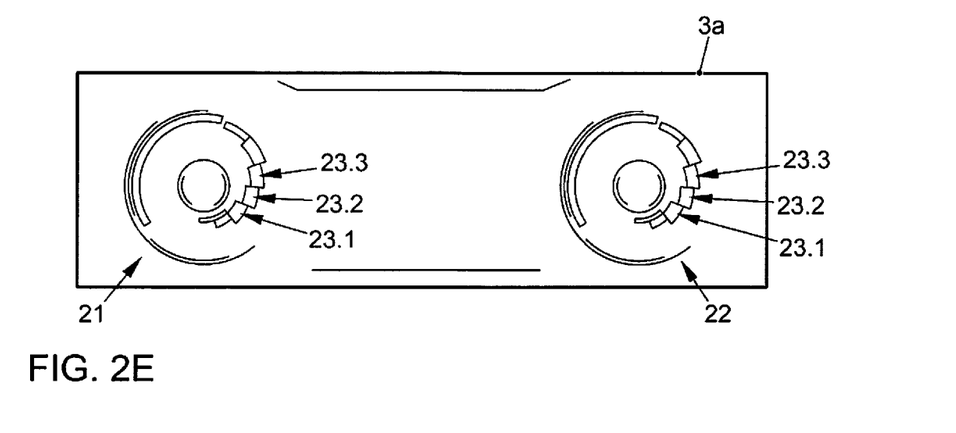

In the case shown in FIG. 2C, a transition signal has been received and a transition to the display of the second display 20 initiated. The first graphics object 11 disappears, which is displayed by fading out which is indicated by dashed lines.

At the same time, the second display 20 appears, wherein this is displayed by a combination of fading in with increasing brightness and an elementary structure with a movement of individual displayed elements. The appearance of the second display therefore comprises a movement effect. In this context, in FIG. 2D the contours of the display objects 21, 22 of the second display 20 are already indicated. In the case illustrated in FIG. 2E, a structure animation of scales 23 is additionally displayed by the appearance and displacement of scale segments 23.1, 23.2, 23.3: the latter appear in the central region of the display objects 21, 22 which are formed as round instruments, and they then move in a coordinated manner from the center to the edge where they assume a target position at the circular contour of the display objects 21, 22. In this way, the scales 23 are constructed incrementally. In the case shown in FIG. 2F, an indicator element 24 has additionally appeared for each of the display objects 21, 22, which indicator element 24 is formed in the example in the manner of a light beam which illuminates a specific position of the scale 23 and as a result indicates a value.

Figure 2F:
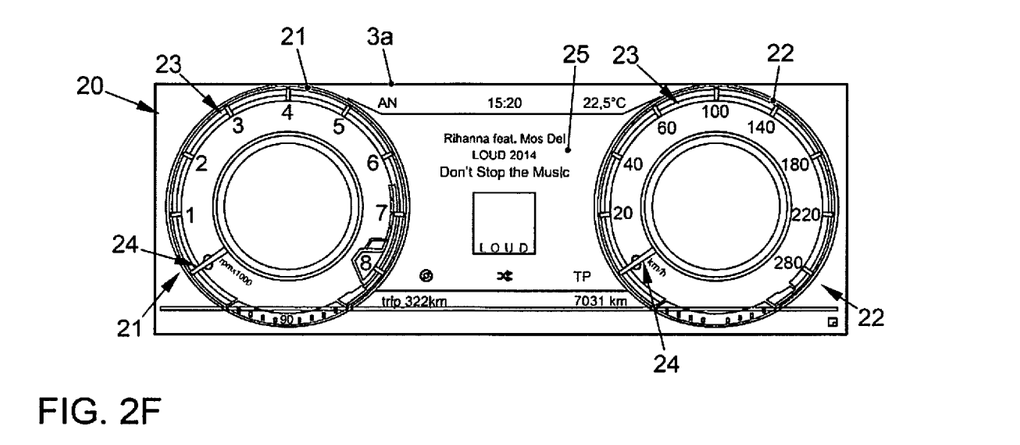

The display objects 21, 22 illustrated here are formed in the manner of round instruments such are as known in combination instruments. In this context, the speed of the vehicle 1 and the rotational speed of an engine of the vehicle 1 are displayed. In further exemplary embodiments, other forms and designs can be realized and other values can be output. In addition, more than the two display objects 21, 22 can be provided, for example, a further round instrument or an object for numerical display.

Between the display objects 21, 22 an intermediate space is formed which is embodied as a background display in the exemplary embodiment, wherein the display objects 21, 22 are displayed in the foreground and appear to be superimposed on the background display. The area of the intermediate space serves here as an application region 25 in which output data of various devices of the vehicle 1 are displayed. This can be, for example, outputting of a media player and, in addition, for example, output data of a navigation or of another driver assistance system can be output.

Alternatively or additionally, in further exemplary embodiments other effects, for example, by the configuration of the coloring of the display, can be provided for outputting the appearance and disappearance of displays 10, 20.

With reference to FIGS. 3A to 3G, an exemplary embodiment of a display which is generated by the disclosed method is explained on two display areas. In this context, the vehicle information system as described above and the disclosed method for operating the system are taken as the basis.

The animation described below describes a wake-up scenario in which the appearance of the first display 10 on the first display area 3*a*, here an Active Info Display, is displayed with a logo as a first graphics object 11. Based on this first display, a transition to the second display 20 is generated during which a pulse 12 moves in a graphic form to the second display area, here a Head Unit.

This pulse 12 is made to move further into the Head Unit synchronously
and therefore builds up the entire structure of the second display 20. In this context, application areas 25.1, 25.2, 25.3 are displayed which are assigned to specific applications of the computer 6 and on the area of which output data (also referred to as Interface contents) of these applications can be displayed. The application areas 25.1, 25.2, 25.3 are initially displayed empty here and form in this context a framework (Interface Structure) which predefines an arrangement of the loaded output data at the end of the animation.

In the case shown here, the second display is a graphic user interface, wherein, in the case of the second display area 3*b*, operator control can take place by a touch-sensitive interface.

Figure 3A:
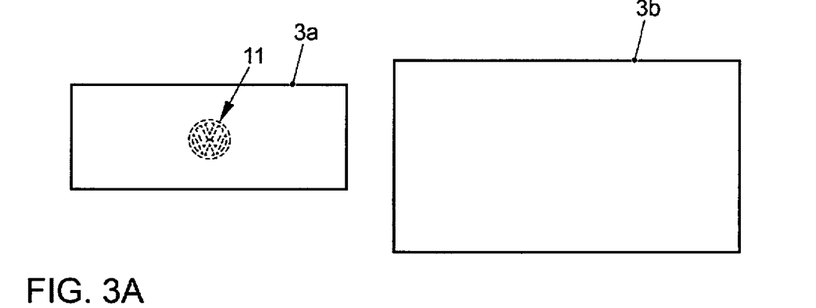
FIGS. 3A-3G show an exemplary embodiment of a display, generated by the disclosed method, on two display areas.
Figure 3B:
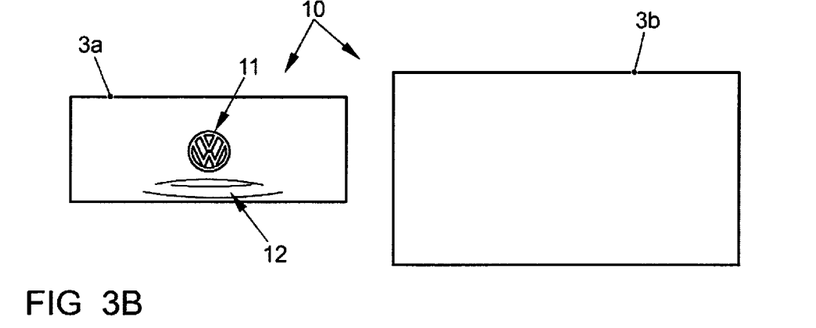

In a first operation, shown in FIGS. 3A and 3B, the activation signal is received during the unlocking of the vehicle 1, and the appearance of the first display 10 is initiated. The animation sequence in this respect is detected by the non-volatile storage medium 7 and runs essentially as explained above with reference to FIGS. 2A to 2F. In this context, in the exemplary embodiment there is provision that a display takes place only by the first display area 3*a*, while the second display area 3*b* remains dark.

In the background, the computer 6 of the vehicle 1 is started and a powering up is carried out. In this context, data is loaded and programs are started. The chronological sequence of the loading is detected, and the point by which the powering up is expected to be concluded is determined. The wake-up scenario is formed here in such a way that it has ended essentially at the same time as the powering up of the computer 6.

Figure 3C:
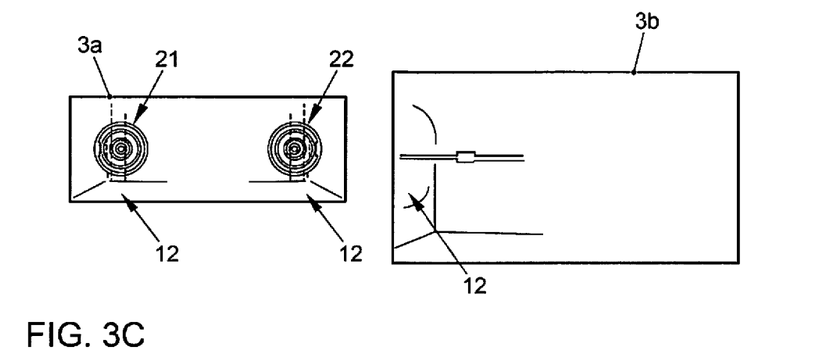

In a further operation, when the driver's door closes the transition signal is received and a transition to the second display 20 is output. The display of the transition and the appearance of the second display 20 comprise a movement effect from the first display area 3*a* to the second display area 3*b*: in this context, a light pulse 12 which originates from the region of the first graphics object 11 and spreads in the direction of the second display area 3*b* is illustrated, wherein an appearance of the second display 20 is displayed synchronously with the movement of the light pulse 12. In this context, a structure is generated from the center of the first display area 3*a* and second display area 3*b*.

The light pulse 12 which originates from the first display area 3*a* is passed on in synchronism with a specific time in the direction of the second display area 3*b*. Subsequently, the second display 20 is structured in synchronism with the movement of the light pulse 12. In this context the arrangement of the display areas 3*a*, 3*b* in the vehicle 1 is taken into account, that is to say the direction of movement of the light pulse 12 is formed in such a way that a continuous profile of the movement is displayed in the vehicle 1.

Figure 3D:
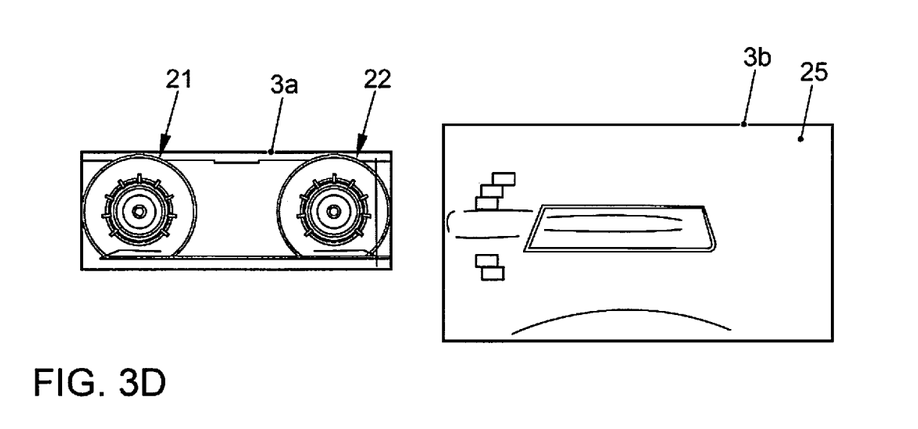
Figure 3E:
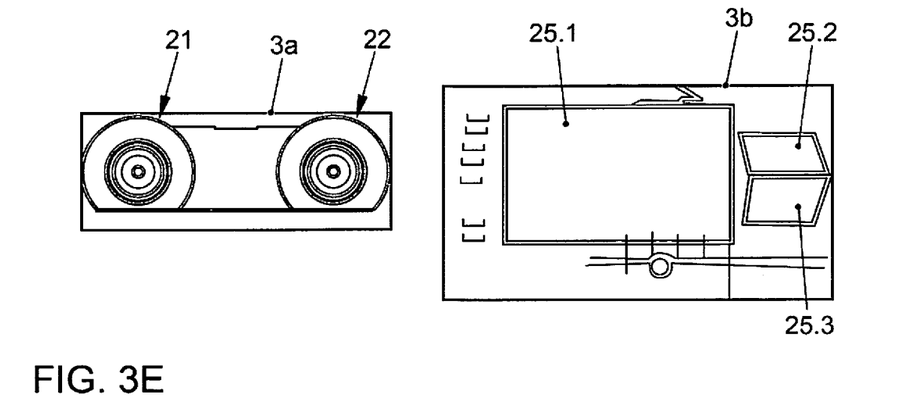
Figure 3F:
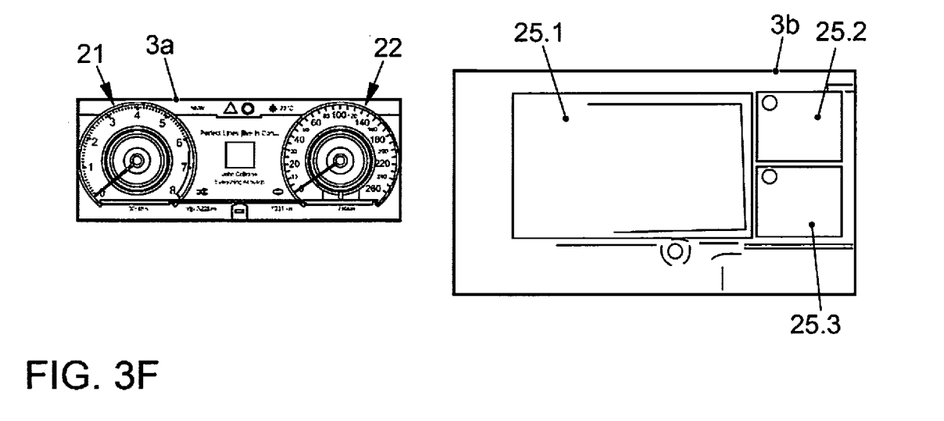

In this context, as shown in FIGS. 3D to 3F, an application region 25, which comprises application areas 25.1, 25.2, 25.3, is formed in the region of the second display area 3*b*. These application areas are displayed here as operator control tiles, wherein these appear through a rotational movement, wherein "folding up" of the operator control tiles is illustrated.

Figure 3G:
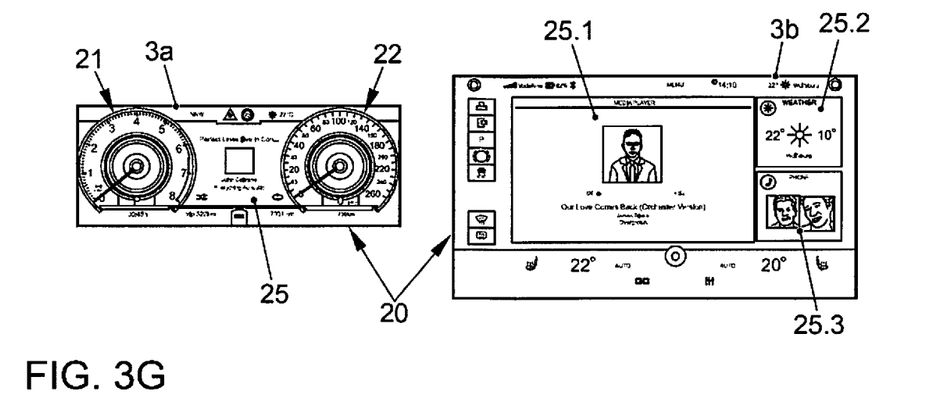

At the end of the graphic animation, the Interface structure remains stationary without content, and the application areas 25.1, 25.2, 25.3 are displayed as gray operator control tiles in which no output data of application programs are displayed. This case is shown in FIG. 3F. Subsequent to this, as shown in FIG. 3G, output data of respectively assigned application programs of the computer 6 are displayed in the region of the application areas 25.1, 25.2, 25.3.

In this context, the method can be applied easily by a uniform (generic) animation to various configurations of the user interfaces of various vehicle models. The first display 10 and second display 20 can be formed largely independently of the application programs which are currently being executed or are currently available, since the display of the output data of the applications only takes place in a last operation. The application areas 25.1, 25.2, 25.3 can be used here as generic animation templates which can be adapted to different contents and output data. In this context, predefined variables can be used for the application areas 25.1, 25.2, 25.3 which can, however, be pre-animated without content and may have the output data of the applications which are loaded at this time superposed on them only at the end of the method. The application areas 25.1, 25.2, 25.3 are embodied here as operator control tiles or Interface tiles.

The time period of the powering up, running in the background, of the computer 6 and of the loading process for the contents can be spanned by the animation of the transition from the first display 10 to the second display 20, since this process is not completely concluded until after a specific time period.

During the animation, an interaction of the two display areas 3a, 3b by a fluid movement from the first display area 3a to the second display area 3b is output. The light pulse 12 moves between the display areas 3a, 3b. Here, the precisely coordinated chronological matching of the displays is also significant for achieving a fluid movement.

The light pulse 12 can be formed in different ways in various exemplary embodiments, wherein various graphic elements can be used. For example, a light beam can be displayed which moves from the first graphics object 11 to the sides of the first display area 3a, and as a result "carries along with it" graphic elements of the second display 20. These graphic elements may be, for example, square tiles which migrate, for example, from left to right and illuminating contours can be displayed in which a moving lighting effect is displayed around the contours of the application areas 25.1, 25.2, 25.3, or a light cone can be displayed which permits a perspectively illustrated "3D interior space" behind the operator control tiles to be illuminated from one side, and which then disappears at the end. For example, there may also be provision here that the display is formed in the specific manner depending on the time of day, wherein, different lighting effects can be used.

LIST OF REFERENCE NUMBERS

1 Vehicle
2 Control unit
3a First display area
3b Second display area
4 Receiver unit
5 Graphics unit
6 Computer
7 Non-volatile storage medium
8 Signal-generating unit
10 First display
11 First graphics object
12 Light pulse
20 Second display
21 First display object
22 Second display object
23 Scale
23.1, 23.2, 23.3 Scale segments
24 Indicator object
25 Application region
25.1, 25.2, 25.3 Application areas

The invention claimed is:

1. A method for operating a transportation vehicle information system of a transportation vehicle, the method comprising:
receiving an activation signal generated in response to detection of a preparatory action of a user for putting the transportation vehicle into operation;
generating and displaying graphics data of an activation animation sequence synchronized with events for preparing for transportation vehicle operation, wherein the generating and displaying includes output of graphics data on a first display area included in a combination instrument of the transportation vehicle that is separated from a second display area in a head unit of the transportation vehicle, wherein the activation animation sequence is generated and output as a function of the receipt of the activation signal, wherein, during the activation animation sequence, the first display area includes a first graphics object as part of the activation animation sequence while the second display area of the head unit remains blank;
receiving a transition signal generated in response to further detection of an additional preparatory action of the user for putting the transportation vehicle into operation; and
in response to the receipt of the transition signal after the reception of the activation signal, the first display area is transitioned to no longer output the first graphics object and to output a first and a second display object that each include transportation vehicle parameter indicator elements.

2. The method of claim 1, wherein one of the detected preparatory actions comprises an approaching process, an unlocking process, opening of a door, getting in or sitting down by a user or starting of the vehicle.

3. The method of claim 1, wherein the first graphics object comprises an indication of a manufacturer of the transportation vehicle or of the transportation vehicle information system.

4. The method of claim 1, wherein, to generate the graphics data on the first display area, the activation animation sequence is retrieved from a non-volatile storage medium of the transportation vehicle.

5. The method of claim 1, wherein the first display object and the second display object each include scales and indicator elements.

6. The method of claim 5, wherein the scales of the first and second display objects have scale elements, wherein, during transition to appearance of the first and second display objects, animation moves the scale elements with respect to target positions along the scales.

7. The method of claim 5, wherein the first display object and the second display object are arranged spaced apart from one another with an intermediate space therebetween, wherein a background display is displayed in the intermediate space with a chronological offset such that display objects included in the intermediate space are perceived separately after the start of the appearance of the first and second display objects.

8. The method of claim 5, wherein the first display object and/or the second display object are embodied as a round instrument.

9. The method of claim 1, further comprising detecting transportation vehicle operational data, wherein the first and second display objects are generated as a function of the detected vehicle operational data.

10. The method of claim 1, wherein rotational speed of an engine of the transportation vehicle is displayed in the first display object and speed of the transportation vehicle is displayed in the second display object.

11. The method of claim 1, wherein, during the activation animation sequence, a starting process of a computer is carried out, wherein the activation animation sequence is generated and displayed as a function of a chronological sequence of the computer starting process.

12. The method of claim 1, wherein following receipt of the transition signal, the transition on the first display area along with a transition on the second display area displays a movement effect from the first display area to the second display area following which the second display area displays an application region, wherein the application region comprises application areas, and wherein application programs executed both by a computer of the transportation vehicle and by a user's mobile device output data therein.

13. The method of claim 12, wherein the application areas of the second display area are assigned to applications, and display output data of the applications.

14. A vehicle information system of a transportation vehicle, the vehicle information system comprising:
   a signal-generating unit which detects a preparatory action of a user for putting the transportation vehicle into operation, and generates an activation signal as a function of the detected preparatory action;
   a receiver unit which receives the activation signal;
   a graphics unit which generates and displays graphics data of an activation animation sequence synchronized with events for preparing for transportation vehicle operation, wherein the generation and display includes output of graphics data on a first display area included in a combination instrument of the transportation vehicle that is separated from a second display area in a head unit of the transportation vehicle, wherein the activation animation sequence is generated and displayed as a function of the receipt of the activation signal, wherein, during the activation animation sequence, the first display area includes a first graphics object as part of the activation animation sequence while the second display area of the head unit remains blank;
   wherein, after the reception of the activation signal, in response to receipt of a transition signal generated in response to further detection of an additional preparatory action of the user for putting the transportation vehicle into operation, the first display area is transitioned to no longer output the first graphics object and to output a first and a second display object that each include transportation vehicle parameter indicator elements.

15. The system of claim 14, wherein one of the detected preparatory actions comprises an approaching process, an unlocking process, opening of a door, getting in or sitting down by a user or starting of the vehicle.

16. The system of claim 14, wherein the first graphics object comprises an indication of a manufacturer of the transportation vehicle or of the transportation vehicle information system.

17. The system of claim 14, wherein, to generate the graphics data of the first display, an animation sequence is retrieved from a non-volatile storage medium.

18. The system of claim 14, wherein the first display object and the second display object each have scales and indicator elements.

19. The system of claim 18, wherein the scales of the first and second display objects have scale elements, wherein, during transition to appearance of the first and second display objects, animation moves the scale elements with respect to target positions along the scales.

20. The system of claim 18, wherein the first display object and the second display object are arranged spaced apart from one another with an intermediate space therebetween, wherein a background display is displayed in the intermediate space with a chronological offset such that display objects included in the intermediate space are perceived separately after the start of the appearance of the first and second display objects.

21. The system of claim 18, wherein the first display object and/or the second display object are embodied as a round instrument.

22. The system of claim 14, wherein vehicle operational data are detected and the first and second display objects are generated as a function of the detected vehicle operational data.

23. The system of claim 14, wherein rotational speed of an engine of the transportation vehicle is displayed in the first display object and speed of the transportation vehicle is displayed in the second display object.

24. The system of claim 14, wherein, during the activation animation sequence, a starting process of a computer is carried out, wherein the activation animation sequence is generated and displayed as a function of a chronological sequence of the starting process.

25. The system of claim 14, wherein following receipt of the transition signal, the transition on the first display area along with a transition on the second display area displays a movement effect from the first display area to the second display area following which the second display area displays least one display object and an application region, wherein the application region comprises application areas, and wherein application programs executed both by a computer of the transportation vehicle and by a user's mobile device output data therein.

26. The system of claim 25, wherein the application areas of the second display area are assigned to applications, and display output data of the applications.

* * * * *